United States Patent [19]

Jureit et al.

[11] E Re. 31,234

[45] Reissued May 10, 1983

[54] HINGED CONNECTOR PLATE

[75] Inventors: John C. Jureit, Coral Gables, Fla.; John M. Des Jardins, Columbiaville, Mich.

[73] Assignee: Gang-Nail Systems, Inc., Miami, Fla.

[21] Appl. No.: 915,445

[22] Filed: Jun. 14, 1978

Related U.S. Patent Documents

Reissue of:

[64] Patent No.: 3,823,522
Issued: Jul. 16, 1974
Appl. No.: 303,939
Filed: Nov. 6, 1972

[51] Int. Cl.[3] ..... E04B 1/32; E04B 7/16

[52] U.S. Cl. ..... 403/163; 52/641; 52/645

[58] Field of Search ..... 52/713, 71, 70, DIG. 6; 85/11, 13

[56] References Cited

U.S. PATENT DOCUMENTS

| | | | |
|---|---|---|---|
| D. 32,900 | 7/1900 | Huelster . | |
| D. 32,901 | 7/1900 | Huelster . | |
| D. 45,209 | 2/1914 | Viragh . | |
| 357,188 | 2/1887 | Edmondson et al. . | |
| 1,170,188 | 2/1916 | Rasmussen . | |
| 1,232,168 | 7/1917 | Aronson | 52/641 |
| 1,327,808 | 1/1920 | Cheshire . | |
| 1,564,715 | 12/1925 | Russell | 16/128 R |
| 2,092,684 | 9/1937 | Uhl . | |
| 2,233,351 | 2/1941 | Rowe | 29/437 |
| 2,762,091 | 9/1956 | Jenne . | |
| 3,040,479 | 6/1962 | Ayotte . | |
| 3,178,780 | 4/1965 | Booher . | |
| 3,404,496 | 10/1968 | Ballard | 52/641 X |
| 3,423,898 | 1/1969 | Tracy et al. | 52/753 L |
| 3,479,783 | 11/1969 | Jureit | 52/753 L |
| 3,480,305 | 11/1969 | Jureit . | |
| 3,605,355 | 9/1971 | Solesbee | 52/641 X |
| 3,638,373 | 2/1972 | Chapman | 52/641 X |
| 3,699,731 | 10/1972 | Arnold | 52/64 |
| 3,701,225 | 10/1972 | Perry | 52/641 X |
| 3,729,111 | 4/1973 | Farnsworth | 16/168 |
| 3,736,708 | 6/1973 | Chapman | 52/92 |

FOREIGN PATENT DOCUMENTS

| | | | |
|---|---|---|---|
| 504550 | 2/1927 | Fed. Rep. of Germany FF | 113/116 |
| 538863 | 11/1931 | Fed. Rep. of Germany . | |
| 850946 | 1/1953 | Fed. Rep. of Germany . | |
| 1086986 | 2/1955 | France . | |
| 314864 | 7/1956 | Switzerland . | |
| 128555 | 6/1919 | United Kingdom . | |
| 307001 | 3/1929 | United Kingdom | 16/162 |

*Primary Examiner*—John E. Murtagh
*Attorney, Agent, or Firm*—LeBlanc, Nolan, Shur & Nies

[57] ABSTRACT

The joint includes a pair of connector plates each having a plurality of teeth struck therefrom for embedment into the ends of wooden members forming a part of a truss or frame. The teeth are distributed over the major portion of the plates inset from end portions thereof. Openings are provided in the plate end portions. In one form hereof, the metal about the opening in one plate end is extruded through the opening in the end of the other plate whereby the extruded metal forms a bearing surface for pivoting the plates relative to one another. In another form, teeth are struck from marginal portions about the opening of one plate and received through the end opening in the other plate. These teeth are formed over to effect a bearing surface. Bolts or rivets may also be used to pivotally connect the plates one to the other.

3 Claims, 13 Drawing Figures

FIG.5
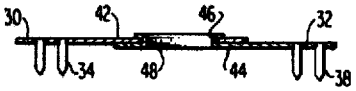
FIG.6
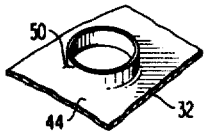
FIG.7
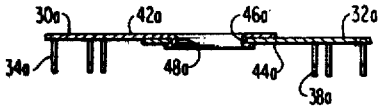
FIG.8
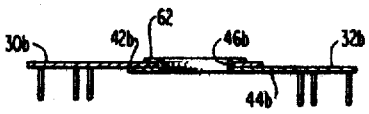
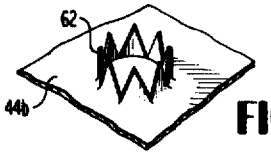
FIG.9
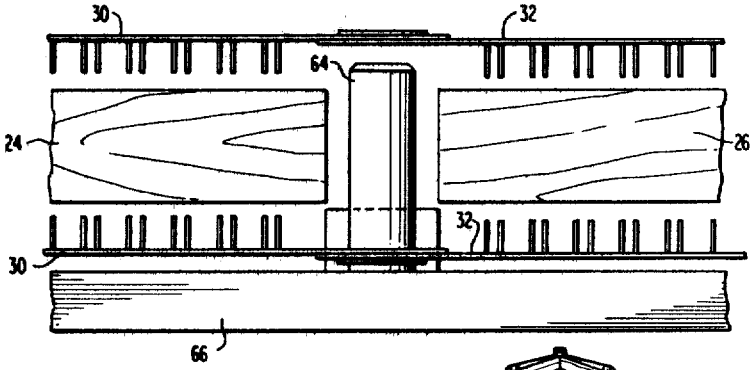
FIG.10
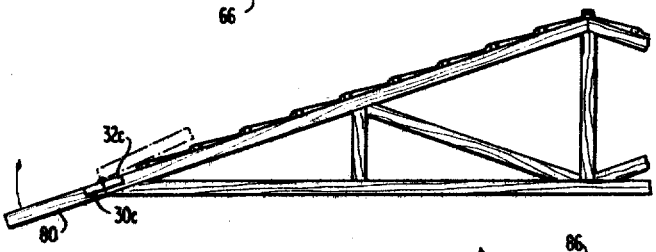
FIG.11
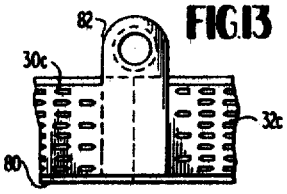
FIG.13
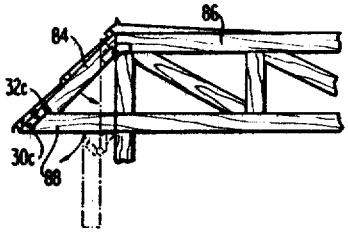
FIG.12

HINGED CONNECTOR PLATE

Matter enclosed in heavy brackets [ ] appears in the original patent but forms no part of this reissue specification; matter printed in italics indicates the additions made by reissue.

The present invention relates to joints for structural wooden members and more particularly relates to joints for pivotally connecting structural wooden members one to the other, and the frames or trusses in which such joints and members are employed.

In forming wooden frames, for example trusses, in the wooden building industry, it is common practice to prefabricate such frames at a fabrication assembly plant and to transport the completed frames to a job site for assembly as part of the building structure. Many such prefabricated frames, particularly trusses, are assembled on jigs with the members of the trusses secured one to the other by connector plates, the teeth of which are pressed into the wooden joints. Such connector plates may be of the type disclosed in U.S. Pat. No. 2,877,520 of common assignee herewith. After fabrication, the trusses are normally bundled and loaded on trucks or the like for transportation to the job site. This prevailing industry practice constitutes a significant advance in comparison with the more costly and prior conventional fabrication of the individual trusses at the job site in that, inter alia, the trusses are more accurately cut, and in fact, are stronger and capable of withstanding structural loading in excess of conventional wooden framing. Increasingly larger spans of wooden frames including wooden trusses are being employed and this trend toward increasing size constitutes a problem for the industry in transporting the prefabricated frames from the fabrication assembly plant to the job site.

Further, modular building construction is being increasingly utilized in present day construction. Modular units are very often constructed at a prefabrication plant and shipped to a construction site for integration into the total building structure. Increasingly larger modular units are being prefabricated and this too, poses a problem in transporting the modular units from the prefabrication plant to the construction site.

Conventional road clearances simply do not permit the transport of such large frames, trusses and modular units exceeding a specified road height and/or width limitation. For example, it is practical and desirable to prefabricate at a factory site trusses for use in mansard roof designs or trusses having large overhangs or modular units having high peaks and/or overhangs. The excess dimensions of these trusses and modular units often preclude overroad transport thereof. However, it remains extremely desirable to prefabricate frames, trusses and modular units at a prefabrication assembly site utilizing connector plates since considerable savings in costs and efficiency are effected.

According to the present invention, there is provided a novel and unique joint for connecting the members of a wooden frame and the like, for example a truss, whereby the frame can be reduced in overall size, i.e., the length and/or height, whereby frames of significant height and/or length and the modular units formed thereby, previously precluded from transport over roads due to oversize dimensions, can be reduced in size to dimensions equal to or less than acceptable road width and height clearances. To effect this, the present invention provides a joint comprised of a pair of plates each having a plurality of elongated nail-like teeth struck therefrom for embedment into the ends of the respective wooden members. The teeth are distributed over the major portion of the plate leaving an end portion free of teeth and which end portion is provided with an opening. The end portions of the plates are overlapped and connected to form a pivotal joint. In one form hereof, the pivotal joint is formed by extruding the metal about the end opening in one plate through the end opening in the other plate. The extruded metal forms a bearing about which the plates are free to rotate. Pairs of such pivotally connected plates are, of course, applied to opposite sides of the wooden members of the frame with the pivotal axis of each set of paired plates being coincident. In a further form of plate hereof, the metal about the opening in the end of one of the plates is struck to form a plurality of generally triangularly shaped teeth which extend through the end opening in the other plate. The tips of the teeth are then bent over whereby the teeth provide a bearing about which the plates are free to pivot. Alternatively, each plate may be provided with an opening through which a bolt or rivet passes to pivotally secure the plates one to the other.

In applying the joint to a frame or truss, the member or members of the frame which exceeds the allowable height or width is pivotally connected to another member of the frame by means of the joint hereof whereby the frame member can be folded back substantially in the plane of the frame thereby reducing the overall dimension of the frame. For example, in a mono-pitch roof truss, the upper chord can be divided into two wooden members joined one to the other by the joint hereof. Also, the web at one end of the monopitch truss can be joined to the end of either the upper or lower chord by the joint hereof. It will thus be appreciated that the upper chord can be pivoted about the joint and likewise the web member about its joint whereby the mono-pitch truss can be folded to a size satisfactory for road clearance. After transport, these pivoted members are returned to their proper position and secured by employing similar plates with a bolt or the like extending through the openings formed in the ends of the plates.

It is a further feature hereof, that in the foregoing described mono-pitch groove truss, the hinge point is located at the point of inflection of the top chord. Thus moment resistance at the hinged joint is not required. Also, since the axial force in the high panel of the mono-pitch truss is zero when the diagonal web member in such panel is in compression, the joint hereof need not resist axial force either in compression or tension. While the joint hereof can carry tensile and compressive loads, the plates in the mono-pitch application carry only shear loading due to the roof loads.

In order to effect a pivoting action in frames or trusses of the type previously described, the ends of the members joined by the plates may be spaced one from the other with the pivotal axis lying between the spaced ends. In this manner, the one member of the chord is free to rotate relative to the other member of the chord. Where compression loadings are anticipated, the ends of the members of the chords can be butted one to the other with the hinge axis located at the butting faces of the members. To effect a pivoting action, the side of one of the members is cut away permitting the end portion of the other member to swing about the pivotal axis.

Accordingly, it is a primary object of the present invention to provide a joint of the type employing connector plates with struck teeth wherein the members of the joint are pivotally connected one to the other.

It is another object of the present invention to provide a joint of the type employing connector plates with struck teeth in oversize frames, trusses, and the like and wherein such frames can be reduced in size to acceptable road height and width clearance limitations.

It is still another object of the present invention to provide a joint of the type employing connector plates with struck teeth which permits pivotal action of the joint members prior to final assembly of the frame and which joint is capable of carrying structural loading in final assembly.

It is a further object of the present invention to provide a joint having the foregoing characteristics which is readily, easily, and inexpensively fabricated and readily applied to the members to be joined.

It is a still further object of the present invention to provide frames, trusses, and the like in which parts of the frames can be pivoted in the plane of the frame to reduce its overall size and thereafter rigidly maintained in place without diminution of the load bearing capabilities of the frame.

These and further objects and advantages of the present invention will become more apparent upon reference to the following specification, appended claims and drawings wherein:

FIG. 5 is a fragmentary cross-sectional view taken about on line 5—5 in FIG. 2;

FIG. 6 is a fragmentary perspective view of the bearing for providing the pivotal action between the plates forming the joints illustrated in the prior FIGS. 2 and 3;

Figure 3:
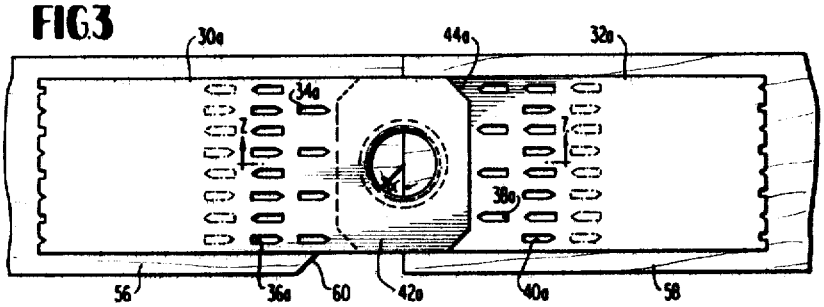
FIG. 3 is a view similar to FIGS. 2 and illustrating a further embodiment of the joint hereof.
Figure 4:
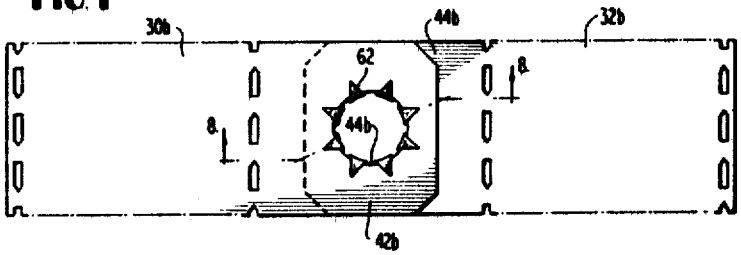
FIG. 4 is a side elevational view of a still further form of the joint hereof.

FIGS. 7 and 8 are fragmentary cross-sectional views taken about on lines 7—7 and 8—8 in FIGS. 3 and 4, respectively;

FIG. 9 is a fragmentary perspective view of the bearing for providing the pivotal action between the plates illustrated in FIG. 4.

FIG. 10 is an enlarged fragmentary exploded side elevational view of members of a frame lying on their sides and illustrating a method of applying the joints hereof to the frame members;

FIG. 11 is a fragmentary cross-sectional view illustrating the roof truss with a pivoted overhang;

FIG. 12 is a fragmentary side elevational view of a mansard-type roof truss employing a joint constructed in accordance with the present invention; and FIG. 13 is an enlarged fragmentary side elevational view of a further form of joint hereof.

Figure 1:
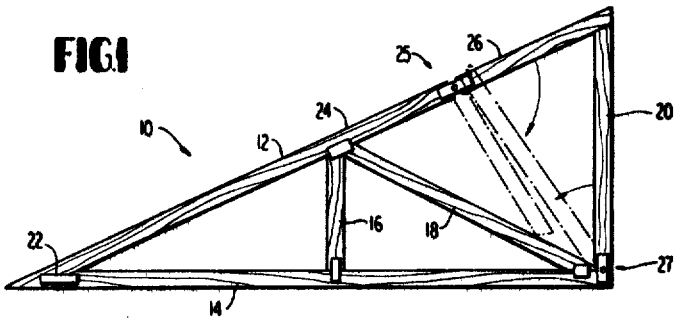
FIG. 1 is a side elevational view of a mono-pitch roof truss employing a joint constructed in accordance with the present invention.

Referring now to the drawings, particularly to FIG. 1, there is illustrated a mono-pitch roof truss generally designated 10 and comprised of a top chord 12, bottom chord 14, an intermediate web 16, diagonal brace 18 and an end web 20. In accordance with conventional formation of prefabricated roof trusses, the joints of the foregoing members with the exceptions noted below, are normally joined one to the other at a prefabricated assembly plant by connector plates 22 which may be of the type described and illustrated in U.S. Pat. No. 2,877,520 of common assignee herewith. For reasons which will become clear from the ensuing description, the joints between the top chord 12 and the end web 20 as well as the end web 20 and bottom chord 14 are not joined at the fabrication assembly plant in this conventional manner. Rather, the top chord and end web are left unconnected while the end web 20 is connected to the lower chord 14 by a joint constructed in accordance with the present invention.

In accordance with the present invention, it is desirable that the height of truss 10 be reduced in order that the overall height of the truss and transport vehicle combined can be reduced to a height at or below the permissible road clearance height, for example 13 feet 6 inches. To this end, the top chord 12 is divided into two discrete chord segments 24 and 26 and joined one to the other at like ends by a pivotal joint generally indicated 25 and constructed in accordance with the present invention. Likewise, the lower end of end web 20 is secured to the end of lower chord 14 through a pivotal-type joint generally indicated 27 and constructed in accordance with the present invention. By utilizing such pivotal joints, upper chord segment 26 is pivotable downwardly, for example, to a position such that its distal end engages brace 18 as indicated by the dashed lines. Also, web 20 is pivotable in the plane of the truss to a position on top of the segment 26 also as illustrated by the dashed lines. It is readily apparent that the overall height of truss 10, when the segment 26 and web 20 are pivoted into the dashed line positions, is substantially reduced and this reduction is of a magnitude to permit transport of the truss over the road.

Figure 2:
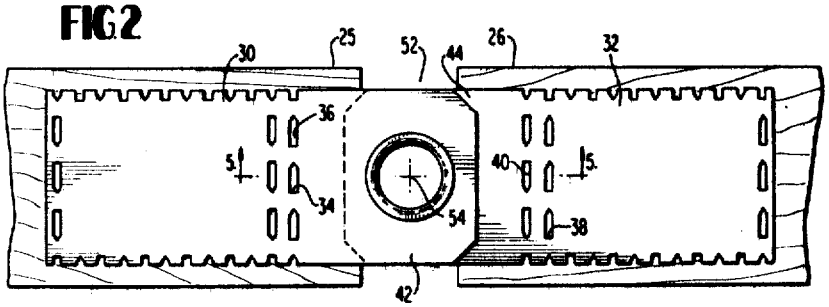
FIG. 2 is an enlarged fragmentary side elevational view of one of the joints illustrated in FIG. 1.

Referring now to FIG. 2, there is illustrated an embodiment of the joint hereof and which may comprise the joint 25 connecting upper chord segments 24 and 26. Particularly, joint 25 is comprised of a pair of elongated sheet metal plates 30 and 34, for example 20 U.S. Standard Gauge galvanized sheet steel. Other gauges of metal may of course be utilized. Plate 30 has a plurality of teeth 34 struck to project substantially at right angles to plate 30 for embedment into the side face of upper chord segment 24. Teeth 34 leave slots 36 in plate 30 which extend away from teeth 34 in a direction transverse to the long dimension of plate 30. Teeth 34 are thus formed into transversely extending rows. As illustrated, slots 36 of adjacent rows extend from teeth 34 in opposite directions whereby the teeth of adjacent rows are staggered relative to one another. Similarly, plate 32 has a plurality of teeth 38 struck to project substantially at right angles to plate 32 for embedment into the side face of upper chord segment 26. Teeth 38 have slots 40 in plate 32 and which slots extend away from teeth 38 in a direction transverse to the long dimension of plate 32. Teeth 38 are thus formed into transversely extending rows. As illustrated, slots 40 of adjacent rows extend from teeth 38 in opposite directions whereby the teeth of adjacent rows are staggered relative to one another. The struck teeth 34 and 38 may be configured and arranged in the plate similarly as the teeth of the connector plates in U.S. Pat. No. 2,877,520.

As illustrated, the teeth 34 and 38 are distributed over the major portion of the areas of the respective plates leaving end portions free of struck teeth. For example, the teeth 34 of plate 30 are struck over the major portion of its area, such teeth being inset from end portion 42 thereof. Similarly teeth 38 are struck over the major portion of the area of plate 32, such teeth being inset from its end portion 44. End portions 42 and 44 are provided with openings 46 and 48, respectively (FIG. 5). Particularly, and to form a pivotal connection between plates 30 and 32, the margins 50 about opening 48 in plate end portion 44 are bent or extruded through opening 46 and, on the side of plate 30 remote from plate 32, are bent back away from the openings to clamp the marginal portions of plate end 42 about opening 44 between the bent-back portions of plate 32 and plate end portion 42. This extruded metal forms a bearing surface about which the plates 30 and 32 are free to pivot, the axis of rotation being coincident with the axes of openings 46 and 48. Also, this extrusion permanently secures plates 30 and 32 one to the other.

To form joint 25, the pivotally connected plates 30 and 32 are spotted on respective opposite sides of the joint. In this form of joint, upper chord segments 24 and 26 are spaced back one from the other leaving a gap 52. The teeth of the plates are then embedded into the members 24 and 26 on opposite sides thereof with the pivotal axis 54 of the plates located medially between the ends of the members. In this manner, the plates and members on the opposite sides of axis 54 are free for pivotal movement relative to one another within a limited range.

Referring now to the embodiment of the joint hereof illustrated in FIG. 3, there is illustrated elongated plates 30a and 32a formed of similar material as in the previous embodiment. Plate 30a has a plurality of teeth 34a struck to project substantially at right angles to plate 30a for embedment into a member 56 of a frame. Teeth 34a leave slots 36a in plate 30a and which slots extend away from teeth 34a in a longitudinal direction. Teeth 34a are thus formed into longitudinally extending rows. As illustrated, the slots 36a of adjacent rows extend from teeth 34a in opposite directions whereby the teeth of adjacent rows are staggered relative to one another. Plate 32a similarly has a plurality of teeth 38a struck to project substantially at right angles to plate 32a for embedment into another framing member 58. Teeth 38a leave slots 36a in plate 32a and which slots extend away from teeth 38a in a longitudinal direction. Teeth 38a are likewise formed into longitudinally extending rows. As illustrated, the slots 36a of adjacent rows of teeth extend from the teeth in opposite directions whereby the teeth are staggered along plate 32a. As in the previous embodiment, the teeth of plates 30a and 32a are distributed over the major portion of the areas of the plates leaving the plate end portions 42a and 44a free of struck teeth. End portions 42a and 44a each have respective openings 46a and 48a. To form the pivotal connection between plates 30a and 32a, marginal portions of the plate end portion 42a about opening 48a are bent or extruded through opening 46a in plate end portion 44a and, on the side of plate 32a remote from plate 30a, are bent back or formed to clamp end portions 42a and 44a one to the other. The marginal portions thus form a bearing for pivoting the plates relative to one another. Alternately, the underlying end portion 44a can be provided with marginal portions struck through the opening in end portion 42a similarly as in the embodiment hereof of FIG. 2.

In this form of joint hereof the framing members 56 and 58 are buttend end to end against each other and the respective teeth of plates 30a and 32a are embedded into the opposite sides of members 56 and 58. This joint is particularly utilized where cmpression forces are transmitted from one member to the other as the framing members are butted. In order to obtain pivotal action of the members relative to one another, a side portion of member 56 is cut away at 60 along a line which intersects the axis of rotation of the plates 30a and 32a. That is, the line 44 extends from the butted ends of the members and coincident with the axes of openings 46a and 48a toward one side of the frame 56 whereby the members can be pivoted on that one side through an angle $\alpha$ determined by the angle of cut 44. Each of the frame members may of course be provided with a cutout applied on like or opposite sides relative to one another to respectively increase the angle through which the members are pivoted or to provide for pivoting in opposite directions.

Referring now to the embodiment illustrated in FIG. 4, each of the plates 30b and 32b have teeth configurations and patterns, for illustrative purposes, as described above in connection with the embodiment of FIG. 2 although other configurations and patterns of teeth may be provided. However, the pivotal connection between the plate end portions 42b and 44b is formed by providing triangular-shaped teeth 62 about the opening in plate end portion 44b (FIG. 9). Teeth 62 are struck from plate end portion 44b to project at right angles whereby they are received within the opening 46b in plate end portion 42b. The tips of teeth 62 are then bent over whereby plate end portions 42b and 44b are clamped one to the other with the teeth 62 forming a bearing surface for pivoting the plates relative to one another.

Referring now to FIG. 10, the embodiments hereof illustrated in FIGS. 2 and 4 are readily applied on opposite sides of the frame members with the openings in registry one with the other thereby assuring accurate coincidence of the pivotal axes of the plates on opposite sides of the frame members. For example, when the joints are spotted on opposite sides of the framing members 24 and 26, the openings 46 and 48 in the lowermost pair of plates are first received over an upstanding pin 64 carried by a reaction pad 66 on a jig table, not shown. The framing members 24 and 26 are then located on the jig table and the upper pair of plates are spotted along the upper side of the framing members with their openings received over pin 64. In this manner, pin 64 maintains the plates on opposite sides of the wooden framing members in accurate registry one with the other as the press, not shown, embeds the teeth of the plates into the opposite sides of the framing members.

As noted previously, the joint illustrated in FIG. 2 is particularly useful to connect the upper chord segments 24 and 26 one to the other to form the complete top chord 12. Preferably, the joint 25 is located at a point of inflection in the loading where only shear forces act on the plates of the joint. That is, in this form of truss, there are virtually no compressive, tensile or bending forces along the top chord at a point between webs 16 and 20. Substantially only shearing forces occur at this point. Accordingly, the joint illustrated in FIG. 2, with the ends of the frame members or chord segments spaced one from the other, is particularly suitable for use at this point along the upper chord.

For connecting the lower end of web 20 to bottom chord 14, the joint illustrated in FIG. 3 may be utilized. Particularly, the inside edge of web 20 is cut away at a specified angle, for example the angle $\alpha$ shown in FIG. 3, whereby the web 20 may be pivoted in the plane of the truss toward the diagonal brace 18 and into a position overlying the pivoted top chord segment 26 as illustrated by the dashed lines of FIG. 1. When the truss arrives at the construction site, segment 26 and web 20 are pivoted to the full line position and their ends secured suitably one to the other. This securement may take the form of conventional nailing or may be effected by connector plates applied on opposite sides of the joint by a suitable power-actuated press, for example, the C-clamp press described and illustrated in U.S. Pat. No. 3,402,869 of common assignee herewith.

It will be appreciated that plates having the foregoing described pattern and distribution of teeth may be provided with the plate end portions having plain openings without extrusions or teeth struck therefrom. These plates can be embedded into the opposite sides of the framing members similarly as previously noted with their projecting end portions lapped such that a bolt, pin or rivet is received through the aligned openings of the four plates. Suitable means for securing the bolt or pin in the joint can be provided such as nuts threadedly engaged on opposite ends of the bolts or pins. Small cotter-like retainer pins may also be employed at opposite ends of the pin extending through the plate openings. Also, nuts and bolts may be utilized to secure each pair of lapped plate end portions one to the other. Alternatively, rivets can be utilized to effect the pivotal connection between each pair of lapped end portions.

Referring now to FIG. 11, there is illustrated a standard roof truss having an overhang designated 80. As is conventional, these roof trusses are transported in bundles over the road and it is oftentimes desirable to reduce the length of the trusses. Accordingly, and in accordance with the present invention, the overhang 80 is connected to the truss for pivotal movement from an extended position as illustrated back onto the top chord of the truss substantially through an angle of 180°. This pivotal connection is afforded by a joint constructed in accordance with the present invention. Particularly, in this form of joint, the paired plates 30c and 32c on opposite sides of the joint may have teeth configured and arranged similarly as either FIGS. 2 or 3. However, the end portions of the plates have laterally projecting ears 82 as illustrated in FIGS. 13. The ears have registering openings and marginal portions of one of the ears are bent or extruded through the opening in the other ear to from a bearing for pivoting the plates relative to one another. Such bearing may take any one of the form of bearings disclosed in FIGS. 2–4. The pivotal axis is thus located to one side of the framing members whereby the overhang 80 is free to pivot completely back onto the upper chord of the truss. Furthermore, this offset pivotal axis permits full abutment of the ends of the overhang 80 and upper chord member of the truss preventing further downward pivotable movement of overhang 80. Moreover, the projection of the ears does not interfere with the roof line or become unsightly as their extent is less than the depth of the tiles, for example of the type disclosed in U.S. Pat. No. 3,544,353 of common assignee herewith and which tiles are applied to the lower edge of the truss and the overhang upon final construction. Thus, the tiles overlie the ears 82 and hide them from view.

Referring now to the embodiment hereof illustrated in FIG. 12, a similar type joint can be applied at the ends of a mansard-type roof. For example, the inclined chord 84 can be pivotally connected to the upper chord 86 of the roof truss by plates pivotally coupled one to the other as described above. Likewise the support member 88 can be pivotally coupled to the end of chord 84 by a similar joint. The opposite end of the member 88 is, of course, not secured to the truss at the prefabrication assembly plant. Accordingly, the member 88 and chord 84 can be pivoted downwardly such that they lie in a vertical position illustrated by the dashed lines. Thus, the overall length of the mansard roof truss can be reduced. At the construction site, the chord 84 and support member 88 are pivoted to the illustrated full line position whereupon the inner end of the member 88 can be suitably secured to the truss.

It will be appreciated that various modular units may be constructed on a series of trusses spaced one from the other and wherein the trusses extend too high or too wide or both to permit transport over the road having conventional road clearances. For example, a modular unit may be formed of a plurality of mono-pitch roof trusses similar to the truss of FIG. 1 hereof but with the upper chord extended at the eaves as illustrated in FIG. 11. Thus, the modular unit may have too high a peak or too great a width or both to permit road transport. With the hinged joint hereof the height of the unit can be reduced by folding the upper [chors] *chords* of the trusses as illustrated in FIG. 1. Also, the width of the unit can be reduced by folding back the overhang of each truss as illustrated in FIG. 11. Accordingly, the modular unit can be reduced in height and or width as desired to facilitate road travel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

[1. A joint for joining adjacent wooden structural members comprising:

first and second sheet metal planar plates, each of said plates having a plurality of teeth struck therefrom leaving a plurality of slots in said plate, an end portion of each said plate having an opening therethrough, said teeth being distributed over the major portions of the areas of said plates and spaced back from said end portions thereof, said plates being arranged for embedment of their teeth into side faces of the structural members with the teeth of said first plate adapted for embedment into one of said members and the teeth of said second plate adapted for embedment into the other of said members such that the plate end portions overlap one another with their respective openings registering one with the other, and means passing through at least one of said openings for pivotally connecting said first and second plates one to the other for swinging movement of said first plate and the one member relative to said second plate and the other member, said pivotal connecting means including marginal portions of the plate surrounding the opening in the end portion of said first plate projecting through the opening in the end portion of said second plate and forming a bearing therefor.]

[2. A joint according to claim 1 wherein said marginal portions comprise a continuous band of metal extending from the end portion of said first plate through the opening in the end portion of said second plate and bent laterally away from said openings to clamp the marginal portions of said second plate about its opening between said first plate and the bent portion thereof.]

[3. A joint according to claim 1 wherein said marginal portion of said first plate includes a plurality of teeth struck from said first plate and extending through the opening in the end portion of said second plate, the tips of said latter teeth being bent over onto the margin of said second plate surrounding its end opening to clamp the plates one to the other with said latter teeth serving as a bearing surface therebetween.]

[4. A joint according to claim 1 wherein said plates are elongated and said teeth in each plate comprise elongated nail-like teeth struck to form longitudinally extending rows thereof with the slots left thereby in said plates extending from said teeth in a longitudinal direction.]

[5. A joint according to claim 4 wherein the teeth of said first plate project from the same side thereof as said projecting marginal portions.]

[6. A joint according to claim 4 wherein the teeth of said first plate project from the opposite side of said plate from said projecting marginal portions.]

[7. A joint according to claim 1 wherein said plates are elongated and said teeth in each plate comprise elongated nail-like teeth struck to form transversely extending rows thereof with the slots left in said plates extending from said teeth in a transverse direction.]

[8. A joint according to claim 7 wherein the teeth of said first plate project from the same side thereof as said projecting marginal portions.]

[9. A joint according to claim 7 wherein the teeth of said one plate project from the opposite side of said plate from said projecting marginal portions.]

[10. A joint for joining adjacent wooden structural members comprising:

first and second sheet metal planar plates, each of said plates having a plurality of teeth struck therefrom leaving a plurality of slots in said plate, an end portion of each said plate having an opening therethrough, said teeth being distributed over the major portions of the areas of said plates and spaced back from said end portions thereof, said plates being arranged for embedment of their teeth into side faces of the structural members with the teeth of said first plate adapted for embedment into one of said members and the teeth of said second plate adapted for embedment into the other of said members such that the plate end portions overlap one another with their respective openings registering one with the other, and means passing through at least one of said openings for pivotally connecting said first and second plates one to the other for swinging movement of said first plate and the one member relative to said second plate and the other member, said plate end portions including coplanar projections on like sides of said plate, the axes of said openings extending through said projections such that the plates are pivotal substantially through 180 degrees.]

[11. A wooden frame comprising at least three wooden structural framing members, means for pivotally connecting adjacent ends of two of said members, said pivotal connecting means including first and second sheet metal planar plates, each of said plates having a plurality of teeth struck therefrom leaving a plurality of slots in said plate, an end portion of each said plate having an opening therethrough, said teeth being distributed over the major portions of the areas of said plates and spaced back from said end portions thereof, the teeth of said plates being embedded into respective side faces of said two framing members with the teeth of said first plate being embedded into one of said members and the teeth of said second plate being embedded into the other of said members such that the plate end portions overlap one another with their respective openings registering one with the other, means passing through at least one of said openings for pivotally connecting said first and second plates one to the other for swinging movement of said first plate and said one member relative to said second plate and said other member, and means for joining the end of said one member remote from said joint to a third member of said frame whereby said one member is maintainable in a substantially rigid position in said frame.]

12. A structural device comprising first and second *elongated* wooden members, means for pivotally connecting said first and second wooden members *at their longitudinal ends* one to the other including first and second *elongated* sheet metal planar plates, each of said plates *being of a sufficient size so that its width covers a major portion of the width of the side face of the corresponding said wooden member and* having a plurality of teeth struck therefrom leaving a plurality of slots in said plate, an end portion of each said plate having an opening therethrough, said teeth being distributed over the major portions of the areas of said plates and spaced back from said end portions thereof, the teeth of said first plate being embedded into the side face of said first wooden member with the teeth of said second plate being embedded into the side face of said second wooden member with the plate end portions overlapping one another and the respective openings in the plate end portions registering one with the other, and means passing through at least one of said openings for pivotally connecting said first and second plates one to the other for *free* swinging movement of said first plate and said one member relative to said second plate and the second member, *after said first and second plates have been pivotally connected to each other and attached to said first and second wooden members, respectively,* the *longitudinal ends* faces [ends] of said first and second wooden members being spaced one from the other with the pivotal axis of the joint passing between the spaced [ends] *longitudinal end faces* of said first and second wooden members.

13. A structural device comprising first and second wooden structural members, means for pivotally connecting said first and second wooden members *at their longitudinal ends* one to the other including first and second sheet metal planar plates, each of said plates having a plurality *of teeth struck therefrom leaving a plurality* of slots in said plate, an end portion of each said plate having an opening therethrough, said teeth being distributed over the major portions of the areas of said plates and spaced back from said end portions thereof, the teeth of said first plate being embedded into the side face of said first wooden member with the teeth of said second plate being embedded into the side face of said second wooden member with the plate end portions overlapping one another and the respective openings in the plate end portions registering one with the other, and means passing through at least one of said openings for pivotally connecting said first and second plates one to the other for swinging movement of said first plate and said one member relative to said second plate and the second member, the side of one of said wooden members at its *longitudinal* end adjacent the *longitudinal* end of the other wooden member being cut away such that the *longitudinal* end portion of the other member is free to move to the opposite side of the pivotal axis of said joint for location within the cut away portion of said one member *so that said wooden members can be arranged with their longitudinal end faces abutting one another.*

[14. A joint according to claim 13 wherein the ends of the wooden members butt one antoher, the pivotal axis of said joint being spaced from said butting portions of said members and on the side thereof containing said cut away portion. ]

*15. A structural device comprising first and second elongated wooden structural members, means for pivotally connecting said first and second wooden members at their longitudinal ends one to the other including first and second elongated sheet metal planar plates, each of said plates having a plurality of teeth struck therefrom leaving a plurality of slots in said plate, an end portion of each said plate having an opening therethrough, said teeth being distributed over the major portions of the areas of said plates and spaced back from said end portions thereof, the teeth of said first plate being embedded into the side face of said first wooden member with the teeth of said second plate being embedded into the side face of said second wooden member with the plate end portions overlapping one another and the respective openings in the plate end portions registering one with the other, and means passing through at least one of said openings for pivotally connecting said first and second plates one to the other for free swinging movement of said first plate and said one member relative to said second plate and the second member after said first and second plates have been pivotally connected to each other and attached to said first and second wooden members, respectively, the side of one of said wooden members at its longitudinal end adjacent the longitudinal end of the other wooden member being cut away such that the longitudinal end portion of the other member is free to move to the opposite side of the pivotal axis of said joint for location within the cut away portion of said one member so that said members can be arranged with their longitudinal end faces facing each other.*

* * * * *